United States Patent
Gabriel

(10) Patent No.: US 10,359,118 B2
(45) Date of Patent: Jul. 23, 2019

(54) VALVE WITH INTEGRAL BALANCING PASSAGE

(71) Applicant: FISHER CONTROLS INTERNATIONAL LLC, Marshalltown, IA (US)

(72) Inventor: Thomas N. Gabriel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 14 days.

(21) Appl. No.: 15/460,945

(22) Filed: Mar. 16, 2017

(65) Prior Publication Data

US 2018/0266568 A1 Sep. 20, 2018

(51) Int. Cl.
| | |
|---|---|
| *F16K 39/00* | (2006.01) |
| *F16K 1/44* | (2006.01) |
| *F16K 1/12* | (2006.01) |
| *F16K 47/08* | (2006.01) |
| *G05D 16/04* | (2006.01) |
| *F16K 39/02* | (2006.01) |

(Continued)

(52) U.S. Cl.
CPC .............. *F16K 1/443* (2013.01); *F16K 1/12* (2013.01); *F16K 27/02* (2013.01); *F16K 27/08* (2013.01); *F16K 39/022* (2013.01); *F16K 47/08* (2013.01); *G05D 16/04* (2013.01)

(58) Field of Classification Search
CPC ..................................................... F16K 39/022
USPC ................... 251/282, 324, 318, 319, 281
See application file for complete search history.

(56) References Cited

U.S. PATENT DOCUMENTS 234,602 A * 11/1880 Moore et al. ......... F16K 39/022
  251/282
511,948 A * 1/1894 Hangsten .................. E03B 9/02
  137/272

(Continued)

FOREIGN PATENT DOCUMENTS

| | | |
|---|---|---|
| CN | 106051171 A | 10/2016 |
| DE | 29816896 U1 | 12/1998 |
| FR | 493200 A | 8/1919 |

OTHER PUBLICATIONS

International Search Report and Written Opinion for International Application No. PCT/US2018/020563 dated Jun. 18, 2018.

*Primary Examiner* — Robert K Arundale
(74) *Attorney, Agent, or Firm* — Marshall, Gerstein & Borun LLP

(57) ABSTRACT

A balanced valve includes a valve body, a valve stem, and first and second flow control members. The valve body forms a channel defining a fluid flow path extending from a valve inlet to a valve outlet via a valve gallery and defines an opening in fluid communication with the gallery. The valve stem has first and second portions and is at least partially disposed within the opening and the gallery. The first flow control member is coupled to the first portion of the valve stem and controls fluid flow along the fluid flow path. The second flow control member is coupled to the second portion of the valve stem and is disposed in the opening of the valve body. The second flow control member and the valve body define a cavity. An integral balancing passage is formed within the valve body and fluidly connects the cavity and the outlet.

20 Claims, 3 Drawing Sheets

(51) Int. Cl.
*F16K 27/02* (2006.01)
*F16K 27/08* (2006.01)

(56) References Cited

U.S. PATENT DOCUMENTS

| | | | | |
|---|---|---|---|---|
| 1,272,957 A | * | 7/1918 | Humphrey | F16K 39/022 |
| | | | | 137/801 |
| 4,029,293 A | * | 6/1977 | Meysenburg | F04B 49/007 |
| | | | | 137/115.13 |
| 5,556,075 A | * | 9/1996 | Weber | F16K 1/34 |
| | | | | 251/282 |
| 6,073,651 A | * | 6/2000 | Conrads | F16K 39/022 |
| | | | | 137/556 |

\* cited by examiner

VALVE WITH INTEGRAL BALANCING PASSAGE

FIELD OF THE DISCLOSURE

The present disclosure generally relates to fluid valves and, more particularly, to post guided angle valves having integral balancing passages.

BACKGROUND

Control valves are commonly used in process control systems to control the flow of process fluids (e.g., liquids or gases). A control valve typically includes an actuator apparatus (e.g., a pneumatic actuator, a hydraulic actuator, etc.) operatively coupled to the flow control member of a fluid valve to automate the control valve. In operation, a controller is often employed to supply a control fluid (e.g., air) to the actuator, which, in turn, positions the flow control member (e.g., a valve gate, a plug, a closure member, etc.) to a desired position relative to a valve seat to control or regulate the fluid flow through the valve.

Angle valves are typically used in the chemical and hydrocarbon industries where control of residual oils or other liquids with coking properties is necessary. These valves use a swept flow passage and nozzle configuration in the throat region where the throat is below the 90° turn to normalize fluid flow and equally distribute fluid across the choking area of the valve plug, thereby improving valve performance.

Balanced plug and valve designs are frequently used to reduce forces required for the actuator to open and close the valve. Static pressure imbalances are canceled by equalizing pressure on the bottom and the top of the plug, thereby allowing the actuator to open and close the valve plug more easily and require less energy and force to do so. Accordingly, smaller, less expensive actuators can be used with these control valves.

Typically, valve plugs are balanced via ports or longitudinal internal passageways formed through the plug. Because balanced valve plugs are used in conjunction with globe valve designs, the plugs are generally short in length and can easily be drilled using a standard drilling or machining process.

As shown in FIG. 1, some known angle valves 100 include a valve body 102 forming a channel 104 defining a fluid flow path that extends from an inlet 106 of the valve body 102 to an outlet 108 of the valve body via a gallery 110 disposed between the inlet 106 and the outlet 108. The valve body 102 further defines an opening 112 disposed in communication with the gallery 110. A valve seat 111 is at least partially formed by the valve body 102 and is disposed in the gallery 110.

A valve bonnet 114 at least partially covers the opening 112 of the valve body 102. A valve stem 116 has a first portion 116a and a second portion 116b, and is at least partially disposed within the opening 112. A flow control member 120 in the form of a plug is coupled to the valve stem 116. The plug 120 is adapted to be moved into and out of sealing contact with the valve seat 111. A liner guide 118 surrounds the plug 120 and assists in guiding movement of the plug 120. It is understood that the valve 100 includes any number of additional components to assist in operation such as, for example, a retainer, a flange, a valve stem spring, any number of gaskets, seat rings, washers, and/or packing rings.

In operation, a controller (not shown) may provide a control signal to an actuator (not shown) operably coupled to the valve stem 116. This control signal causes the actuator to move the valve stem 116 such that the plug 120 moves in a rectilinear path relative to the valve seat 111 to control fluid flow through the valve body 102.

As illustrated in FIG. 1, the liner guide 118 extends from the bonnet 114 into the gallery 110. This protrusion, combined with the elongated configuration of the plug 120, create a flow obstruction that reduces the flow efficiency of the valve. Further, angle valves use plugs 120 that are unbalanced because choking gas valves, such as the angle valve 100, have an elongated shape, and thus an elongated plug 120, and the extended length and small diameter that would be required of a longitudinal internal passageway in the plug 120 cannot be reliably formed. Any insert used to form such an opening would likely break or become damaged during the manufacturing process and additionally may not be able to be removed from the valve plug 120.

SUMMARY

In accordance with one exemplary aspect of the present invention, a balanced valve includes a valve body, a valve stem, a first flow control member, and a second flow control member. The valve body forms a channel that defines a fluid flow path extending from a valve inlet to a valve outlet via a valve gallery disposed between the inlet and the outlet. The valve body further defines an opening disposed in communication with the gallery. The valve stem has a first portion and a second portion and is at least partially disposed within the opening and the gallery. The first flow control member is adapted to be coupled to the first portion of the valve stem, and is further adapted to control fluid flow along the fluid flow path of the valve. The second flow control member is adapted to be coupled to the second portion of the valve stem, upstream of the first portion of the valve stem, and is further adapted to be disposed in the opening of the valve body. A portion of the second flow control member and the valve body define a cavity. An integral balancing passage is formed within the valve body and is adapted to fluidly connect the cavity and the outlet of the valve body downstream of a valve seat of the valve.

In accordance with another exemplary aspect of the present invention, a control valve assembly includes a balanced valve apparatus and an actuator. The balanced valve apparatus includes a valve body, a valve stem, a first flow control member, and a second flow control member. The valve body forms a channel that defines a fluid flow path extending from a valve inlet to a valve outlet via a valve gallery disposed between the inlet and the outlet. The valve body further defines an opening disposed in communication with the gallery. The valve stem has a first portion and a second portion and is at least partially disposed within the opening and the gallery. The first flow control member is adapted to be coupled to the first portion of the valve stem, and is further adapted to control fluid flow along the fluid flow path of the valve. The second flow control member is adapted to be coupled to the second portion of the valve stem and is further adapted to be disposed in the opening of the valve body. A portion of the second flow control member and the valve body define a cavity. An integral balancing passage is formed within the valve body and is adapted to fluidly connect the cavity and the outlet of the valve body downstream of a valve seat of the valve. The actuator is connected to the valve body at the opening and operatively connected to the valve stem.

In further accordance with any one or more of the foregoing exemplary aspects of the present invention, the valve body may include a shaped portion that corresponds to a shape of the gallery. The integral balancing passage may also be shaped to correspond to the shape of the shaped portion of the valve body.

In some examples, the valve body may include a first and a second portion. The first portion of the valve body can include a first portion of the integral balancing passage and the second portion of the valve body can include a second portion of the integral balancing passage. The first portion and the second portion of the valve body are adapted to couple to each other such that the integral balancing passage forms a direct flow passageway between the cavity and the outlet of the valve body downstream of a valve seat of the valve.

In some forms, the second portion of the valve body may include a flange. The valve body may include a connecting region that aligns the first portion of the integral balancing passage and the second portion of the integral balancing passage.

In some examples, the balanced valve may also include a post guide member that is disposed in the gallery. The post guide member may be integrally formed with the valve body. The post guide member may include at least one ribbed member adapted to separate the fluid flow path to reduce turbulence of a fluid traversing the fluid flow path. The post guide member may also include a coupling mechanism to couple the first flow control member to the valve stem.

In some examples, the balanced valve may also include at least one sealing member to seal the cavity from the gallery.

BRIEF DESCRIPTION OF THE DRAWINGS

The above needs are at least partially met through provision of the valve with an integral balancing passage described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
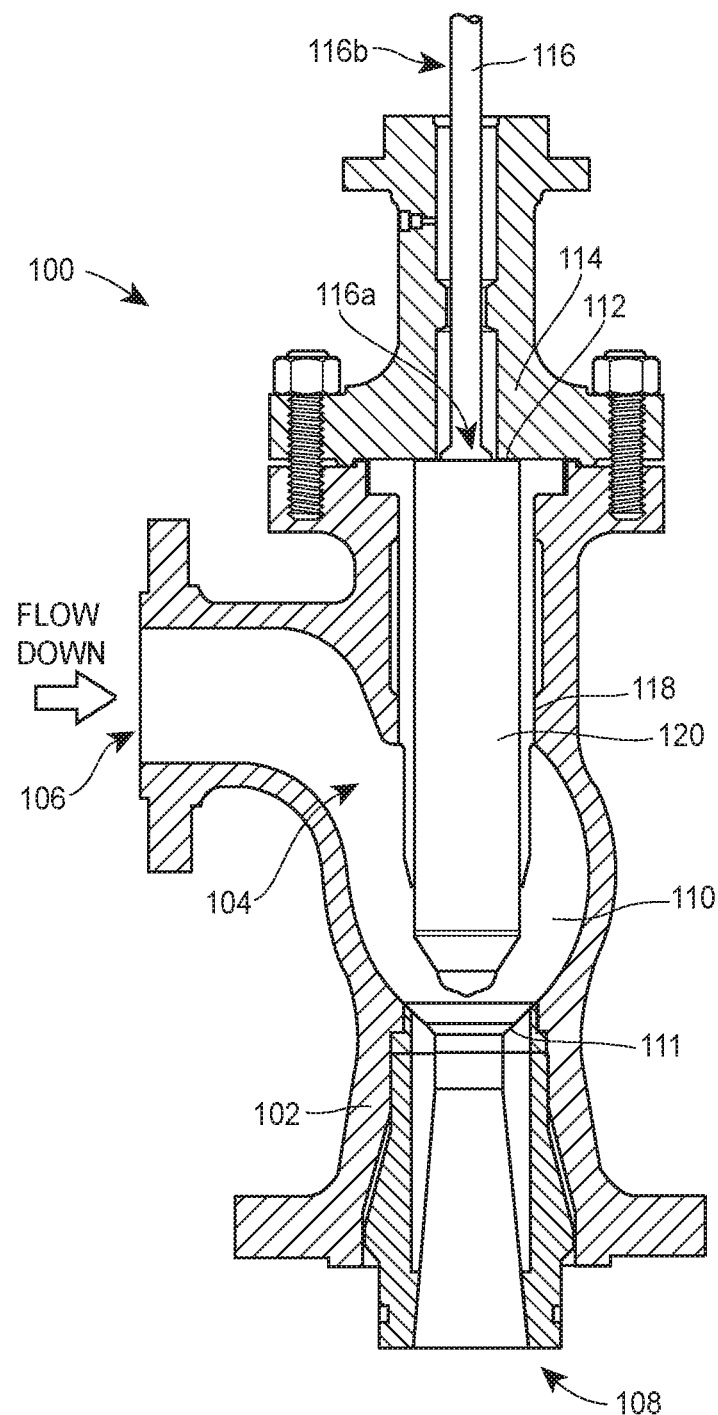
FIG. 1 illustrates a front partial cross-sectional view of a known angle valve.
Figure 2:
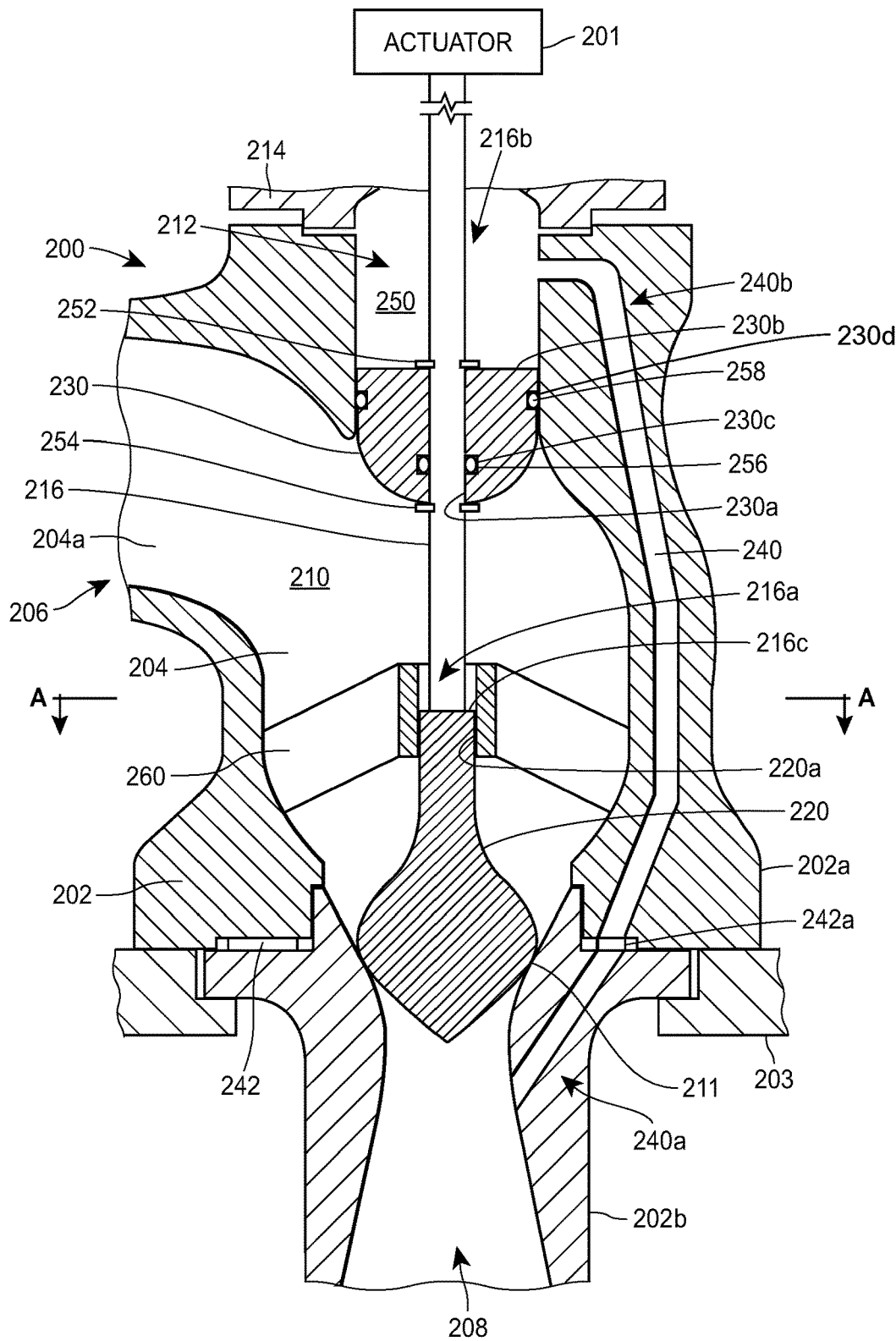
FIG. 2 illustrates a front partial cross-sectional view of an exemplary angle valve having an integral balancing passage in accordance with various embodiments of the present disclosure.
Figure 3:
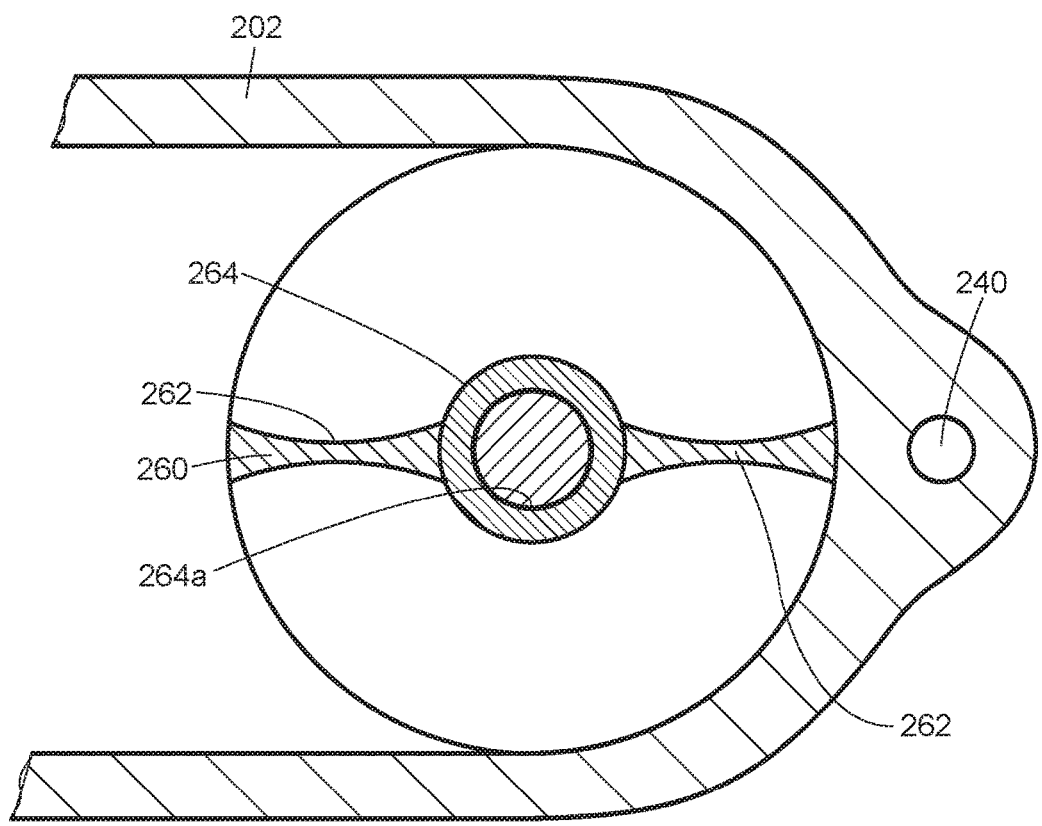
FIG. 3 illustrates a cross-sectional view of the valve of FIG. 2 taken along lines A-A.

An example balanced valve having an integral balancing passage is shown in FIGS. 2 and 3. The example balanced valve has an integral passage that connects an area near the outlet and downstream of a valve seat of the valve to a cavity between an actuator and a flow control member. This internal passageway allows pressure downstream of the valve seat to pressurize the cavity, thereby creating a balanced valve plug, which requires less actuator energy to control fluid flow within the valve than unbalanced valves.

As illustrated in FIG. 2, an example balanced valve 200 can include a valve body 202, a valve stem 216, a first flow control member 220, a second flow control member 230, and an integral balancing passage 240. The valve body 202 forms a channel 204 defining a fluid flow path that extends from an inlet 206 of the valve body 202 to an outlet 208 of the valve body via a gallery 210 disposed between the inlet 206 and the outlet 208. The valve body 202 further defines an opening 212 in fluid communication with the gallery 210. A valve seat 211 is at least partially formed by the valve body 202 and is disposed in the gallery 210. A valve bonnet 214 at least partially covers the opening 212 of the valve body 202 and couples the valve body 202 to the actuator or other actuating device 201. It is understood that the valve 200 includes any number of additional components to assist in operation such as, for example, retainers, flanges, valve stem springs, any number of gaskets, seat rings, washers, and/or packing rings.

The valve stem 216 has a first portion 216a and a second portion 216b. The valve stem 216 is at least partially disposed within the opening 212 and the gallery 210.

In the illustrated example, the first flow control member 220 is a first plug and is coupled to the first portion 216a of the valve stem 216. The first plug 220 is adapted to operably couple to the first portion 216a of the valve stem 216 using any number of approaches. For example, the first plug 220 may include a coupling mechanism 220a that engages a corresponding coupling mechanism 216c disposed on the first end 216a of the valve stem. For example, the coupling mechanisms 220a, 216c may be threads that threadably engage each other. Other examples are possible.

The first plug 220 is adapted to be moved into and out of sealing contact with the valve seat 211 to control fluid flow along the channel 204. In the illustrated example, the first plug 220 is a parabolic plug, however it is understood that any type of plug or flow control member may be used.

In the illustrated example, the second flow control member 230 is in the form of a second plug having an opening 230a and is coupled to the second portion 216b of the valve stem 216 via any number of known approaches. For example, the second end 216b of the valve stem may be inserted through the opening 230b of the plug 230 and may be retained via first and second retaining rings 252, 254. It is understood that any number of retaining rings may be used, and any other known approach may be used to couple the second plug 230 to the valve stem 216.

The second plug 230 is disposed in the opening 212 of the valve body 202. In some examples, the second plug 230 may also include any number of internal grooved regions 230c disposed within the opening 230a to receive any number of inner seals 256, and may further include any number of external grooved regions 230d disposed on an outer surface of the second plug 230 to receive any number of outer seals 258. A portion of the second plug 230 (e.g., an upper surface 230b) cooperates with the valve body 202 surrounding the opening 212 to define a plug cavity 250. The inner and outer seals 256, 258 can be used to operably seal the channel 204 of the valve body 202 from the plug cavity 250. It is understood that in some examples, the inner and outer seals 256, 258 may not be required to seal the channel 204 of the valve body 202 from the plug cavity 250.

The integral balancing passage 240 is formed integrally within the valve body 202 via any known manufacturing process or processes. The valve body 202 may have a shaped portion corresponding to the shape of the gallery 210. The integral balancing passage 240 may be shaped so that it corresponds to the shape of the shaped portion of the gallery 210 to simplify the manufacturing process.

In the illustrated example, the integral balancing passage 240 includes a first end 240a and a second end 240b. The first end 240a of the integral balancing passage 240 terminates at a location in the channel 204 beyond the valve seat 211 that is at or near the outlet 208. The second end 240b of the integral balancing passage 240 terminates at a location in the opening 212 such that a direct path is formed with the plug cavity 250. So configured, the integral balancing passage 240 fluidly connects the plug cavity 250 to the channel 204 at or near the outlet 208.

In operation, the first plug 220 serves as a valve shutoff by selectively restricting and allowing fluid to flow from the inlet 206 to the outlet 208. The second plug 230 serves to entrap pressure in the channel 204 beyond the first plug 220 to balance the system by allowing pressure to flow discretely to the upper surface 230b of the second plug 230 through the integral balancing passage 240. Accordingly, downstream pressure is equalized on the first plug 220 and the second plug 230, thereby creating a balanced plug design.

In some examples, as the valve stem 216 urges the first plug 220 into and out of sealing contact with the valve seat 211, the second end 216b of the valve stem 216 may slide through the opening 230a of the second plug 230 while the second plug 230 remains stationary. However, in other examples, the second plug 230 may be adapted to move in cooperation with the valve stem 216.

The valve body 202 may be constructed from any number of distinct portions adapted to couple to each other. For example, an upper valve body section 202a may be adapted to couple to a lower valve body section 202b. It is understood that any number of approaches to securing the two sections 202a, 202b may be used. For example and as illustrated in FIG. 2, a flange 203 may couple to a ledge disposed on the lower body section 202b. In some examples, the lower body section 202b may itself be a flange or retainer.

In these examples, the first end 240a of the integral balancing passage 240 is formed on the lower valve body section 202b, and the second end 240b of the integral balancing passage 240 is formed on the upper valve body section 202a. A gasket, seal, or other sealing device 242 may be disposed between the upper and lower valve body sections 202a, 202b. The sealing device 242 may include an opening 242a or connecting region that aligns with the integral balancing passage 240 to allow for a direct flow passageway between the outlet 208 and the plug cavity 250. The connecting region 242a may also have a connecting region that aligns the first end 240a of the integral balancing passage 240 with the second end 240b of the integral balancing passage 240.

In some examples, the valve 200 may also include a post guide member 260 disposed in the gallery 210. The post guide member 260 may be integrally formed with the valve body, or may be a separate component that couples to the valve body 202 via any known approach. In any event, the post guide member 260 extends inwardly from an inner surface of the valve body 202. The post guide member 260 can include any number of ribs 262 that couple to and support an integral post guide 264 having an opening 264a to accommodate and guide movement of the valve stem 216 and the first plug 220 in the gallery 210.

The ribs 262 also serve as flow stability dividers by operably dividing the channel 204 into front and rear portions. Accordingly, the ribs 262 will reduce and/or eliminate swirling effects as the fluid flows through the valve body 202. As illustrated in FIG. 3, each of the ribs 262 are formed by concave surfaces which create an inner region having a smaller cross sectional width than the outer regions.

By using two distinct plugs, there is no longer a need for an excessively long plug or for a plug guide to extend from the bonnet 214 into the gallery 210. Utilizing two distinct plugs also reduces the amount of material required and also reduces the plug area within the gallery. Removing the typical elongated post guide that extends downward from a bonnet, and instead using a post guide member 260 that extends inwardly from an inner wall of the valve body 202 improves valve performance by allowing the fluid to make the approximately 90° turn when traversing the flow path with minimal obstructions that may cause the fluid to separate or cause an uneven distribution across the throat region of the gallery 210. Additionally, by using an integral post guide, fluid flow can be stabilized to eliminate fluid swirling and/or turbulence while the fluid traverses the fluid flow path.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A balanced valve, comprising: a valve body forming a channel defining a fluid flow path extending from an inlet of the valve body to an outlet of the valve body via a gallery disposed between the inlet and the outlet, the valve body further defining a valve seat, an opening in fluid communication with the gallery, and a boundary surface; a valve stem having a first portion and a second portion, the valve stem being at least partially disposed within the opening and the gallery; a first flow control member coupled to the first portion of the valve stem, the first flow control member being disposed in the gallery, and the first flow control member being adapted to control fluid flow along the fluid flow path of the valve body by sealingly engaging the valve seat; a second flow control member coupled to the second portion of the valve stem, the second flow control member being disposed in the opening of the valve body, wherein a portion of the second flow control member and the boundary surface of the valve body define a cavity such that the second flow control member is in direct contact with the boundary surface of the valve body, wherein the cavity is operably sealed from the gallery when the first flow control member sealingly engages the valve seat; and an integral balancing passage formed within the valve body, the integral balancing passage being adapted to fluidly connect the cavity and the outlet of the valve body when the first flow control member sealingly engages the valve seat.

2. The balanced valve of claim 1, wherein the valve body comprises a shaped portion that corresponds to a shape of the gallery, and wherein the integral balancing passage is shaped to correspond to the shape of the shaped portion of the valve body.

3. The balanced valve of claim 1, wherein the valve body comprises a first portion and a second portion, wherein the first portion of the valve body includes a first portion of the integral balancing passage and the second portion of the valve body includes a second portion of the integral balancing passage, wherein the first portion and the second portion of the valve body are adapted to couple to each other such that the integral balancing passage forms a direct flow passageway between the fluid flow path and the cavity.

4. The balanced valve of claim 3, wherein the second portion of the valve body comprises a flange.

5. The balanced valve of claim 3, further comprising a connecting region in at least one of the first portion of the valve body and the second portion of the valve body, the connecting region adapted to align the first portion of the integral balancing passage and the second portion of the integral balancing passage.

6. The balanced valve of claim 1, further comprising a post guide member disposed in the gallery, the post guide member extending inwardly from an inner surface of the valve body.

7. The balanced valve of claim 6, wherein the post guide member comprises at least one rib member adapted to separate the fluid flow path to reduce turbulence of a fluid traversing the fluid flow path.

8. The balanced valve of claim 6, wherein the post guide member comprises an opening to guide the first flow control member and the valve stem.

9. The balanced valve of claim 1, further comprising at least one sealing member disposed between the second flow control member and the valve body to seal the cavity from the gallery.

10. The balanced valve of claim 1, wherein the second flow control member sealingly engages the boundary surface of the valve body.

11. The balanced valve of claim 1, wherein the cavity is free of passageways extending into the gallery.

12. A control valve assembly, comprising: a balanced valve apparatus, the balanced valve apparatus comprising: a valve body forming a channel defining a fluid flow path extending from an inlet of the valve body to an outlet of the valve body via a gallery disposed between the inlet and the outlet, the valve body further defining a valve seat and an opening in fluid communication with the gallery; a valve stem having a first portion and a second portion, the valve stem being at least partially disposed within the opening and the gallery; a first flow control member coupled to the first portion of the valve stem, the first flow control member being disposed in the gallery, and the first flow control member being adapted to control fluid flow along the fluid flow path of the valve body by sealingly engaging the valve seat; a second flow control member coupled to the second portion of the valve stem and being disposed in the opening of the valve body, wherein a portion of the second flow control member and valve body define a cavity, wherein the cavity is operably sealed from the gallery when the first flow control member sealingly engages the valve seat; and an integral balancing passage formed within the valve body, the integral balancing passage being adapted to fluidly connect the cavity and the outlet of the valve body when the first flow control member sealingly engages the valve seat; the control valve further comprising an actuator connected to the valve body at the opening and operatively connected to the valve stem.

13. The control valve assembly of claim 12, wherein the valve body comprises a shaped portion that corresponds to a shape of the gallery, and wherein the integral balancing passage is shaped to correspond to the shape of the shaped portion of the valve body.

14. The control valve assembly of claim 12, wherein the valve body comprises a first portion and a second portion, wherein the first portion of the valve body includes a first portion of the integral balancing passage and the second portion of the valve body includes a second portion of the integral balancing passage, wherein the first portion and the second portion of the valve body are adapted to couple to each other such that the integral balancing passage forms a direct flow passageway between the outlet and the cavity.

15. The control valve assembly of claim 14, wherein the second portion of the valve body comprises a flange.

16. The control valve assembly of claim 14, further comprising a connecting region adapted to align the first portion of the integral balancing passage and the second portion of the integral balancing passage.

17. The control valve assembly of claim 12, further comprising a post guide member disposed in the gallery, the post guide member extending inwardly from an inner surface of the valve body.

18. The control valve assembly of claim 17, wherein the post guide member comprises at least one rib member adapted to separate the fluid flow path to reduce turbulence of a fluid traversing the fluid flow path.

19. The control valve assembly of claim 17, wherein the post guide member comprises an opening to guide the first flow control member and the valve stem.

20. The control valve assembly of claim 12, further comprising at least one sealing member disposed between the second flow control member and the valve body to seal the cavity from the gallery.

* * * * *